April 7, 1931. H. KLINGAMAN 1,799,910
AIRPLANE
Filed April 7, 1928
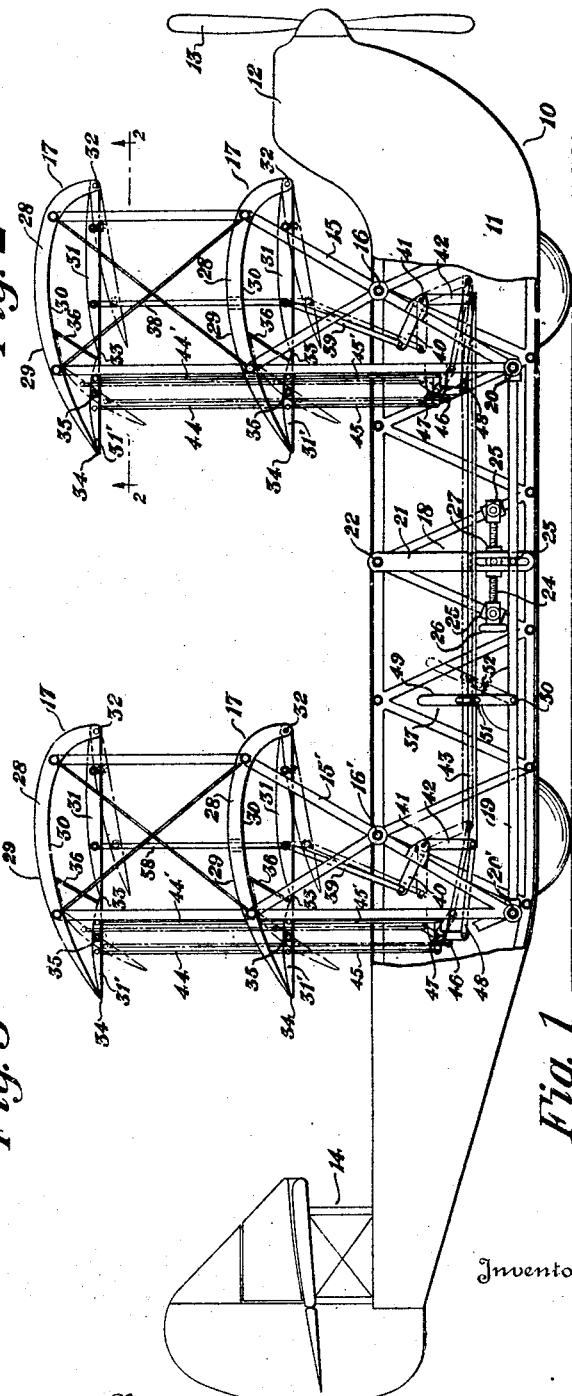
Inventor
Herman Klingaman
By Frease and Bond
Attorneys Patented Apr. 7, 1931

1,799,910

UNITED STATES PATENT OFFICE

HERMAN KLINGAMAN, OF LOUISVILLE, OHIO

AIRPLANE

Application filed April 7, 1928. Serial No. 268,201.

The invention relates to airplanes, and more particularly to the aerodynamic characteristics of aerofoils or wings for airplanes, and to the aerodynamic relationship and the structural arrangement of the wings and fuselages of airplanes.

It is well known that aerofoils or wings of different cross-sections have different aerodynamic characteristics, and it is also well known that the aerodynamic characteristics of an airplane as a whole are dependent among other things upon the relationship between the wings and the other aerodynamic surfaces secured to the fuselage.

For a wing having invariable or constant aerodynamic characteristics, the lift of the wing varies with the angle of attack or incidence, and for taking-off and landing this angle of attack is greater than the angle of attack in normal flying at high speeds.

In an airplane constructed according to the usual practice, the angular relationship between the wing chords and the longitudinal axis of the fuselage is fixed. Consequently for varying the angle of attack, the tail at the end of the fuselage must be either raised or lowered by action of the elevator control surfaces, thereby tipping the longitudinal axis of the fuselage.

This requirement is satisfactory in the case of airplanes having small load carrying capacities, but for airplanes having large load carrying capacities, it is necessary and desirable to maintain the fuselage on an even keel.

Consequently for maintaining the fuselage of an airplane on an even keel during take-off, flying, and landing, the angle between the wing chords and the longitudinal axis of the fuselage must be variable, if the maximum aerodynamic efficiency of the airplane is to be attained.

On the other hand, the aerodynamic characteristics of the wings of a usual airplane are invariable, and for any given wing section, there is a certain minimum horizontal component of velocity of the airplane required to maintain flight, and to prevent falling of the airplane out of control.

This minimum horizontal speed for the angle of attack giving the maximum lift is sometimes known as the landing speed, and it is well known that the landing speeds of airplanes are such as to require extensive unobstructed surfaces on the landing fields, in order that the landing airplanes may taxi for sufficient distances to come to a stop.

In order to reduce the space requirements of landing fields, it is consequently desirable that the landing speeds of airplanes be reduced, and a reduction in landing speed might of course be attained if the aerodynamic characteristics of wing sections were variable.

The objects of the present invention include accordingly:

First, the provision of an improved airplane wing having variable aerodynamic characteristics;

Second, the provision of an airplane employing wings having variable aerodynamic characteristics, and in which the angle between the wing chords and the longitudinal axis of the fuselage may be varied; and Third, the provision of an airplane having wings whose aerodynamic characteristics are variable as aforesaid, and in which the angle between the wing chords and the longitudinal axis of the fuselage is variable, and in which the aerodynamic characteristics of the wings, and the angle between the wing chords and the longitudinal axis of the fuselage may be varied independently or simultaneously with each other.

These and ancillary objects are attained in the present improvements, preferred embodiments of which are hereinafter set forth in detail, and which may be stated in general terms as comprising an airplane including wings, and a fuselage, together with other usual parts of an airplane, and each wing comprising an upper aerofoil and one or more lower aerofoils associated with each other, whereby the outer surfaces of the upper and lower aerofoils in one position constitute a composite aerofoil of a usual cross-sectional contour and substantially continuous outer surfaces, and in other positions constitute a wing whose aerodynamic characteristics tend simultaneously to decelerate the horizontal and vertical velocity components of the resultant airplane velocity, and one or more of the wings being located forward of the center of gravity of the airplane and one or more of the wings being located rearwardly of the center of gravity of the airplane for maintaining the fuselage on an even keel, and structural and control means permitting variation of the position of the wings with respect to the fuselage, and varying the positions of the several aerofoils of each wing, independently or simultaneously, together with other constructions and arrangements as hereinafter set forth and claimed.

Preferred embodiments of the invention are illustrated in the accompanying drawing forming part hereof, in which Figure 1 is a side elevation, with portions broken away and portions in section, illustrating an airplane embodying the present improvements;

Fig. 2, a fragmentary horizontal sectional view as in the direction of the arrows 2—2, of one of the wings thereof; and Fig. 3, a fragmentary sectional view illustrating a modified form of wing embodying the present improvements and having variable aerodynamic characteristics.

Similar numerals refer to similar parts throughout the several views.

The improved airplane indicated generally at 10 in Fig. 1 includes a fuselage 11 which may be of the amphibian type, and is provided at its forward end with an engine housing 12 in which the engine is contained for rotating the propeller 13; and a tail 14 including horizontal and vertical control surfaces may be provided at the rear of the fuselage in a usual manner.

A wing supporting structure 15 is adjustably mounted on the fuselage, preferably on a laterally extending pivot bar 16, located forward of the center of gravity of the airplane.

A similar wing supporting structure 15' is adjustably mounted on the fuselage, preferably on a laterally extending pivot bar 16', located at the rear of the center of gravity of the airplane.

Each of the wing supporting structures 15 and 15' has secured thereon one or more improved wings 17 extending laterally from each side of the fuselage in the usual manner; and as illustrated in Fig. 1, each of the frames carries a biplane wing arrangement.

Means indicated generally at 18 are provided for varying the angle of attack of the wings 17 when the airplane is in flight, and the fuselage is to be maintained on an even horizontal keel.

The means 18 may include a link bar 19 preferably located within the fuselage and pivotally connected at its forward end 20 with the forward frame 15 below the pivotal bar 16, and pivotally connected at its rear end 20' with the rear frame 15' preferably at a location with reference to the pivotal bar 16' similar to the location of the pivotal connection of the end 20 with reference to the pivotal bar 16.

An adjusting lever 21 is pivotally secured at its upper end 22 upon the upper members of the fuselage, and is provided at its lower end with a slot and pin connection 23 with the link bar 19.

Means for partially rotating the adjusting bar 22 about its pivotal axis may include a screw 24 journalled in spaced bearings 25 secured to fuselage members, and arranged to be rotated as by means of a hand wheel 26, and the screw having mounted thereon between the bearings 25 a nut 27 having a pin and slot connection with the bar 21; and the screw will accordingly partially rotate the bar 21 about its axis when the hand wheel 26 is turned, thereby moving forward or backward the link bar 19, and varying the angular relationships between each of the frames 15 and 15' and the fuselage, whereby the angle of attack of the wings may be varied in flight, or may be adjusted on the ground.

Each of the improved wings 17 includes an upper aerofoil 28, preferably having a convex outer surface 29 and a concave inner surface 30.

The upper aerofoil 28 is associated with one or more lower aerofoils 31 and 31' for the purpose of providing a composite aerofoil having variable aerodynamic characteristics; and the leading edge of the upper aerofoil 28 is preferably pivotally connected as at 32 with the leading edge of the forward lower aerofoil 31; and the leading edge of the rear lower aerofoil 31' is arranged in one position to contact with the trailing edge of the forward lower aerofoil 31 as at 33, and the trailing edge of the rear lower aerofoil 31' in this position, preferably contacts with the trailing edge of the upper aerofoil 28 as at 34.

The outer surfaces of the upper and lower aerofoils in each wing 17 constitute a composite aerofoil which in one position, as illustrated in full lines in Fig. 1, has a usual cross-sectional contour and substantially continuous outer surfaces, and may have the areodynamic characteristics of a so-called deep wing section.

For this purpose the lower surfaces of the lower aerofoils 31 and 31' in the position indicated in full lines in Fig. 1 determine a substantially continuous lower surface substantially continuous with the upper surface of the upper aerofoil 28, and these outer upper and lower surfaces in this position form the contour of a so-called deep wing section.

The rear lower aerofoil 31' is preferably arranged to be turned about an axis bar 35 preferably parallel with the axis of the pivotal connection between the upper aerofoil 28 and the forward lower aerofoil 31.

A strip of material 36, preferably of fabric, connects the forward end of the rear lower aerofoil 31' with the inner concave surface 30' of the upper aerofoil 28.

Accordingly, when the lower aerofoils 31 and 31' are positioned as illustrated in the dot and dash lines in Fig. 1, so that the trailing edges of the lower aerofoils are lowered below the locus of the above mentioned substantially continuous lower surface for the deep wing section formed when the upper and lower aerofoils are in the position illustrated in full lines in Fig. 1, a variation takes place in the aerodynamic characteristics of the composite aerofoil which these aerofoils form with the upper aerofoil 28.

In the positions illustrated in dot and dash lines, an increase in the drag of the composite aerofoil immediately occurs, and a greater resistance to falling of the wing is provided, than for the cross-section illustrated in full lines, due to the compression of air in the concave opening formed by the lower surface of the aerofoil 31', the lower surface of the aerofoil 28, and the upper surface of the aerofoil 31, combined with the lift provided by the horizontal velocity of the outer surfaces of the upper aerofoil 28 and the lower aerofoil 31 with relation to the air.

By these means, the speed of landing for the airplane is greatly reduced, and landings become consequently safer.

Means indicated generally at 37 are provided for simultaneously changing the positions of the lower aerofoils of all the wings 17, and may include in the biplane arrangement on each of the frames 15 and 15', as for example on frame 15', a bar 38 pivotally connected at its ends with the aerofoils 31, the lowermost aerofoil 31 being pivotally connected with one end of a bar 39, the other end of which is pivotally connected with the outer end of one arm 40 of a bell crank 41 pivotally mounted on the frame 15', and the outer end of the other bell crank arm 42 of which is pivotally connected with one end of a longitudinally extending bar 43, the other end of which is pivotally connected with the outer end of the similar bell crank arm 42 of the similar linkage for the aerofoils 31 on the other frame 15.

Similarly, on the frame 15' tension members 44 and 44' at opposite sides of the axis bar 35 are pivotally connected at their ends with the aerofoils 31'; and the lowermost aerofoil 31' is pivotally connected with the upper ends of tension members 45 and 45', the lower ends of which are pivotally connected at opposite ends of the head of a T-crank 46, which is pivotally mounted at the intersection of the head with the stem as at 47 upon the frame 15', and a link 48 is pivotally connected at one end with the outer end of the stem of the crank 46 and at the other end with the outer end of the bell crank arm 42.

A similar linkage control is provided for the aerofoils 31' of the wings 17 on the frame 15.

An aerofoils control arm 49 is pivotally mounted at its lower end as at 50 on the link bar 19, and is provided with a slot and pin connection as at 51 with the bar 43, and with means as a latch and sector indicated at 52 for locking the arm 49 at various angular positions with relation to the link bar 19.

Accordingly, the aerodynamic characteristics of all the wings 17 may be varied by operation of the control arm 49, independently of the angle of attack determined by the position of the adjusting lever 21.

The modified embodiment of the improved wing 117 indicated in Fig. 3, includes an upper aerofoil 128, and lower aerofoils 131, 131', 131'', and 131'''. The leading edge of the forward lower aerofoil 131 is pivotally connected as at 132 with the leading edge of the upper aerofoil 128.

The rear lower aerofoils 131', 131'', and 131''' are arranged to be rotated respectively about axis bars 135', 135'', and 135'''; and strip of fabric material 136'' may connect the forward end of the aerofoil 131'' with the inner surface of the aerofoil 128, and a strip of fabric material 136''' may connect the forward end of the aerofoil 131''' with the inner surface of the upper aerofoil 128.

The leading edge of the aerofoil 131' is arranged in the position illustrated in full lines in Fig. 3 to contact with the trailing edge of the aerofoil 131 as at 133.

Similarly the leading edge of the aerofoil 131'' is arranged to contact with the trailing edge of the aerofoil 131' as at 133'; and the leading edge of the aerofoil 131''' is arranged to contact with the trailing edge of the aerofoil 131'' as at 133''.

In the same position, the trailing edge of the aerofoil 131''' is arranged to contact at 134 with the trailing edge of the upper aerofoil 128; and the upper and lower aerofoils constituting in this position a composite aerofoil of a usual cross-sectional contour, and which may have the aerodynamic characteristics of a so-called deep wing section.

In the position illustrated in the dot and dash lines in Fig. 3, the aerodynamic characteristics of the composite aerofoil is varied similar to the variations for the wings 17.

Common control means indicated generally at 160 are provided for simultaneously changing the positions of the several lower aerofoils 131, 131', 131'', and 131''', and may include a crank arm 161 secured to each of the lower aerofoils, and each arm being pivotally connected at its outer end with a link bar 162. A control bar 163 is pivotally connected at its upper end with one of the lower aerofoils, and at its lower end with a suitable linkage, not shown, in the fuselage for changing the positions of the lower aerofoils.

As illustrated in Fig. 3, it is preferable that the trailing edges of the lower aerofoils 131', 131'', and 131''' be each located successively a greater distance from its axis of rotation than the trailing edge of the next adjacent aerofoil closer to the leading edge of the wing.

I claim:

1. An airplane wing including an upper aerofoil, a plurality of lower aerofoils, the upper aerofoil and one of the lower aerofoils being pivotally connected with each other at their leading edges, and a strip of material connecting the leading edge of another of the lower aerofoils with the lower surface of the upper aerofoil, and means for varying the relative positions of the aerofoils, the outer surfaces of the aerofoils in one position constituting a composite aerofoil of a usual cross-sectional contour, and in other positions constituting a composite aerofoil of unusual cross-sectional contour whose aerodynamic characteristics tend simultaneously to increase the drag and limit the speed of falling of the wing.

2. An airplane wing including an upper aerofoil, the outer surface of the upper aerofoil being convex and the inner surface of the upper aerofoil being concave, a plurality of lower aerofoils, the upper aerofoil and one of the lower aerofoils being pivotally connected with each other at their leading edges, and a strip of material connecting the leading edge of another of the lower aerofoils with the lower surface of the upper aerofoil, and means for varying the relative positions of the aerofoils, the outer surfaces of the aerofoils in one position constituting a composite aerofoil of a usual cross-sectional contour, and in other positions constituting a composite aerofoil of unusual cross-sectional contour whose aerodynamic characteristics tend simultaneously to increase the drag and limit the speed of falling of the wing.

3. An airplane wing including an upper aerofoil, two lower aerofoils, the upper aerofoil and one of the lower aerofoils being pivotally connected with each other at their leading edges, the other lower aerofoil being mounted for rotation about an axis extending longitudinally of the aerofoil span, the lower surfaces of the lower aerofoils in one position determining a substantially continuous lower surface substantially continuous with the upper surface of the upper aerofoil, and the sum of the chords of the lower aerofoils being substantially equal to the chord of the upper aerofoil, and means for lowering the trailing edges of the lower aerofoils below the locus of the substantially continuous lower surface.

In testimony that I claim the above, I have hereunto subscribed my name.

HERMAN KLINGAMAN.